(12) United States Patent
Naka et al.

(10) Patent No.: US 7,323,959 B2
(45) Date of Patent: Jan. 29, 2008

(54) TRACKBALL DEVICE

(75) Inventors: Yoshio Naka, Osaka (JP); Tamotsu Yamamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/375,027

(22) Filed: Mar. 15, 2006

(65) Prior Publication Data

US 2006/0208840 A1   Sep. 21, 2006

(30) Foreign Application Priority Data

Mar. 17, 2005   (JP) ............................. 2005-076811

(51) Int. Cl.
*H01H 9/00* (2006.01)

(52) U.S. Cl. ............ 335/205; 335/151; 335/152; 335/153; 335/206; 335/207

(58) Field of Classification Search ........ 335/205–207, 335/151–153
See application file for complete search history.

(56) References Cited

U.S. PATENT DOCUMENTS

| | | | | |
|---|---|---|---|---|
| 3,644,855 A | * | 2/1972 | Cherry et al. ............... | 335/205 |
| 3,903,376 A | * | 9/1975 | Nishikiori .............. | 379/356.01 |
| 4,187,483 A | * | 2/1980 | Whitney ...................... | 335/206 |
| 4,458,226 A | * | 7/1984 | Cho ........................... | 335/205 |
| 4,933,670 A | * | 6/1990 | Wislocki ..................... | 345/167 |
| 5,784,052 A | * | 7/1998 | Keyson ....................... | 345/167 |
| 6,825,831 B1 | * | 11/2004 | Passaro ....................... | 345/167 |
| 6,906,700 B1 | * | 6/2005 | Armstrong ................... | 345/161 |
| 6,909,422 B2 | * | 6/2005 | Yokoji et al. ................ | 345/167 |
| 7,028,454 B2 | * | 4/2006 | Kuissi et al. ................ | 56/10.3 |
| 2002/0030665 A1 | * | 3/2002 | Ano ........................... | 345/168 |
| 2002/0060663 A1 | * | 5/2002 | Wang .......................... | 345/156 |
| 2004/0021638 A1 | * | 2/2004 | Kaizaki et al. ............. | 345/167 |
| 2004/0164963 A1 | * | 8/2004 | Ono et al. ................... | 345/167 |
| 2005/0030278 A1 | * | 2/2005 | Fu .............................. | 345/156 |
| 2005/0034081 A1 | * | 2/2005 | Kaizaki et al. .............. | 345/167 |
| 2006/0092136 A1 | * | 5/2006 | Nishimura et al. ......... | 345/167 |

FOREIGN PATENT DOCUMENTS

JP    2002-373055    12/2002

* cited by examiner

*Primary Examiner*—Elvin Enad
*Assistant Examiner*—Mohamad A Musleh
(74) *Attorney, Agent, or Firm*—Wenderoth, Lind & Ponack, L.L.P.

(57) ABSTRACT

A trackball device of the present invention includes an operating ball, multiple rollers which rotate by contacting the ball while it is rotated, multipole permanent magnets which co-rotate with these rollers, and a reed switch disposed in a position where it turns on and off as a result of changes in magnetic flux caused by the rotation of the permanent magnets so as to provide tactile feedback when the ball is rotated. The trackball device is configured to make an attractive force generated between the reed switch and permanent magnet affect the rotation of the rollers.

7 Claims, 13 Drawing Sheets

FIG. 18 PRIOR ART
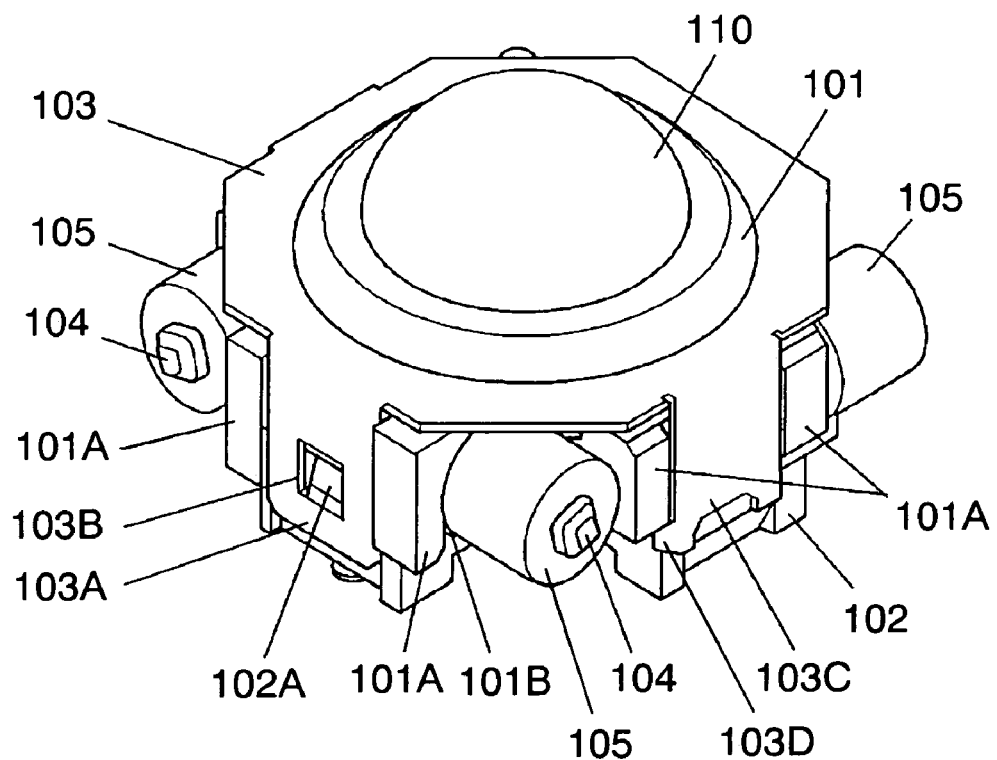
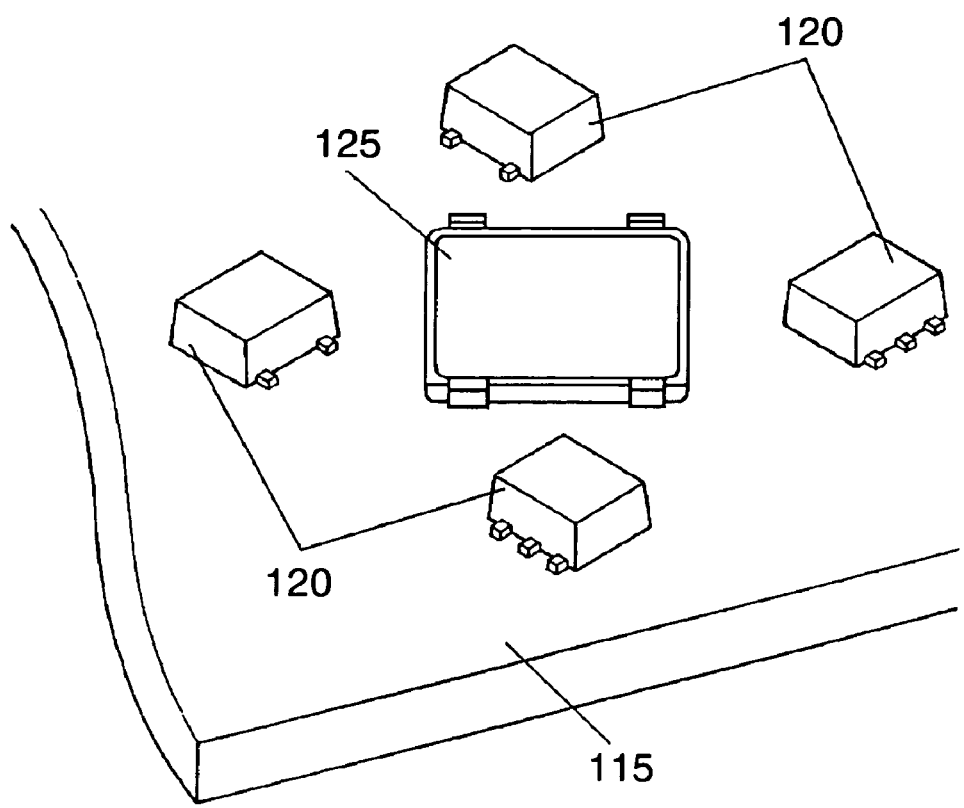

TRACKBALL DEVICE

FIELD OF THE INVENTION

The present invention relates to trackball devices that act as input devices for electronic equipment which provide a range of input operations when the ball is moved in predetermined ways.

BACKGROUND OF THE INVENTION

Trackball devices are currently used for a range of input operations, and are often installed in electronic equipment.

One of these conventional trackball devices is disclosed in Japanese Patent Unexamined Publication No. 2002-373055, and is described below with reference to drawings.

FIG. 18 is a perspective view of the conventional trackball device before assembling a mechanical structure and a wiring board. FIG. 19 is a top view and FIG. 20 is a left side view of the trackball device.

A flat part of metal cover 103 with a hole at its center is disposed on roughly cross-shaped resin upper case 101. This cover 103 has first legs 103A respectively hanging down from the first opposing sides of the flat part, and second legs 103C respectively hanging down from the second opposing sides perpendicular to the first opposing sides. Through-hole 103B is provided at the tip of each of first legs 103A. A lower end of each of second legs 103C is extended into caulking lug 103D which extends sideways.

Roughly cross-shaped base 102 is disposed beneath upper case 101. Projection 102A provided on a side face of base 102 is fitted into through-hole 103B on first leg 103A of cover 103 and caulking lug 103D of second leg 103C catches against and is caulked to a side step on base 102 so as to attach upper case 101 and base 102.

A pair of hooks 101A formed into a hook with a downward opening are provided respectively at parts extending sideways to form the rough cross shape of upper case 101. Openings under these hooks 101A configure roller holders 101B. Roughly cylindrical roller 104 is rotatably housed and held in each of roller holders 101B. In total, there are four rollers 104; and two pairs of two rollers 104 opposing each other, when seen from the top, are disposed at right angles to form a square. The lower part of each roller 104 is rotatably held by the top face of base 102. A center part of each roller 104 is roughened and acts as a contact area.

Ring-shaped magnet 105, which is magnetized to north and south poles alternately at a predetermined angle pitch, is coaxially fixed to one end of each roller 104 such that magnet 105 co-rotates with each roller 104. Rollers 104 are disposed such that these magnets 105 are positioned in dents in a cross of upper case 101 and base 102. In other words, each magnet 105 is disposed at a corner of a square formed by rollers 104.

Ball 110, typically made of fluorine-containing rubber, is housed inside the inner space formed by upper case 101 and base 102.

Wiring board 115 is disposed under this mechanical structure, and Hall IC 120, which is a magnetic sensor, and self-resilient push switch 125 with tactile feedback are mounted on the top face of wiring board 115.

Hall IC 120 is provided respectively at a position vertically opposing to each magnet 105. Each Hall IC 120 outputs on and off signals in response to changes in the magnetic flux of each magnet 105 which co-rotates with corresponding roller 104 when roller 104 is rotated.

Push switch 125 is disposed on wiring board 115 at a position corresponding to the bottom part of ball 110, i.e., the center surrounded by Hall ICs 120; and includes a movable contact, fixed contact, and a flat spring for pushing operating ball 110 upward, which are not illustrated.

Upper case 101 forming this inner space has a cylindrical part protruding upward. Upper round hole 101C at an upper end of this cylinder has a slightly smaller diameter than the diameter of ball 110 at the top center of upper case 101. Ball 110, given an upward force by the flat spring, is positioned upward by the rim of this upper hole 101C, and the top part of ball 110 protrudes outward from this upper hole 101C. A predetermined space is secured between ball 110 in this position and the contact area of each roller 104.

When a downward force is applied to this ball 110, the bottom part of ball 110 presses the flat spring of push switch 125 down such that ball 110 is vertically movable inside the inner space formed by upper case 101 and base 102.

Next, the operation of this conventional trackball device is described.

First is described the case when the top part of ball 110 protruding from upper case 101 is touched, typically with a finger, and rotated to the right, left, front, or back in the normal state in which the trackball device is not operated. Ball 110 contacts the contact area of roller 104 which corresponds to the rotating direction, and rotates this roller 104. At this point, other rollers 104 do not rotate, and push switch 125 is also not activated.

In line with the rotation of this roller 104, magnet 105 fixed to this roller 104 co-rotates. This repeatedly makes the north pole and south pole of magnet 105 alternately approach Hall IC 120 opposing to this magnet 105. In response, Hall IC 120 generates a predetermined output.

When ball 110 is rotated in an oblique direction, ball 110 contacts two perpendicularly positioned rollers 104, and rotates both rollers 104. Accordingly, a predetermined output is generated from two Hall ICs 120.

Next, when the top part of ball 110 is pressed typically with a finger, ball 110 pushes down the center of push switch 125, establishing electrical coupling which is a switched-on state.

If the force applied to ball 110 is then gradually released, ball 110 is moved back upwards, propelled by the return of the flat spring of the push switch. Ball 110 stops when it contacts the rim of upper hole 101C of upper case 101, and thus returns to the normal state.

In this conventional trackball device, Hall IC 120 detects the rotation of magnet 105 in noncontact fashion. This is preferable since it ensures a long service life for the roller rotation detecting part. However, expensive Hall IC 120 drives up the price of the device. In addition, there is a need for better performance of the rotation of the ball 110. In particular, tactile feedback is not distinct when rotating ball 110 in the conventional trackball device.

SUMMARY OF THE INVENTION

A trackball device of the present invention includes an operating ball, multiple rollers which rotate by contacting the ball while it is rotated, multipole permanent magnets which co-rotate with these rollers, and a reed switch disposed in a position where it turns on and off as a result of changes in magnetic flux caused by the rotation of the permanent magnets so as to provide tactile feedback when the ball is rotated.

BRIEF DESCRIPTION OF THE DRAWINGS

FIG. 18 is a perspective view of a conventional trackball device before assembled.

DETAILED DESCRIPTION OF PREFERRED EMBODIMENT

Exemplary embodiments of the present invention are described next with reference to drawings.

First Exemplary Embodiment

Figure 1:
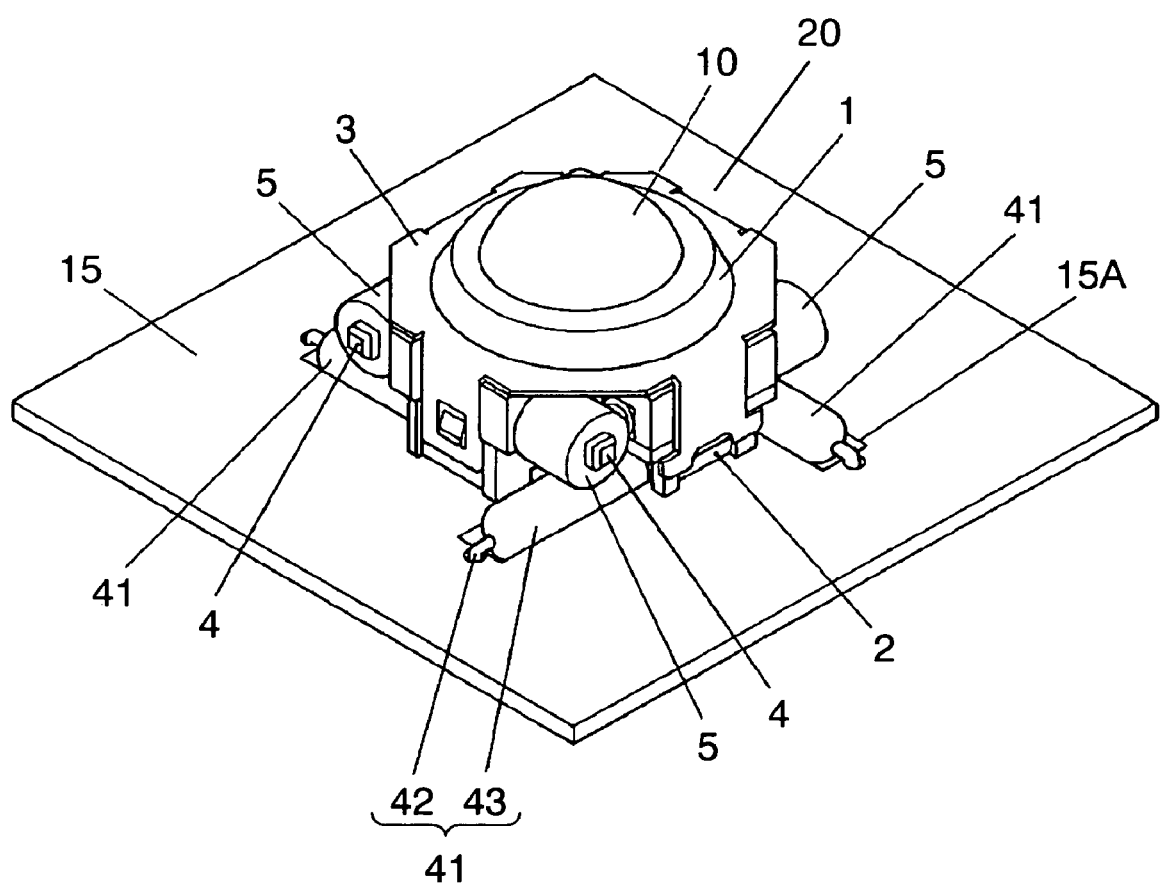
FIG. 1 is a perspective view of an appearance of a trackball device in accordance with the first exemplary embodiment of the present invention.
Figure 2:
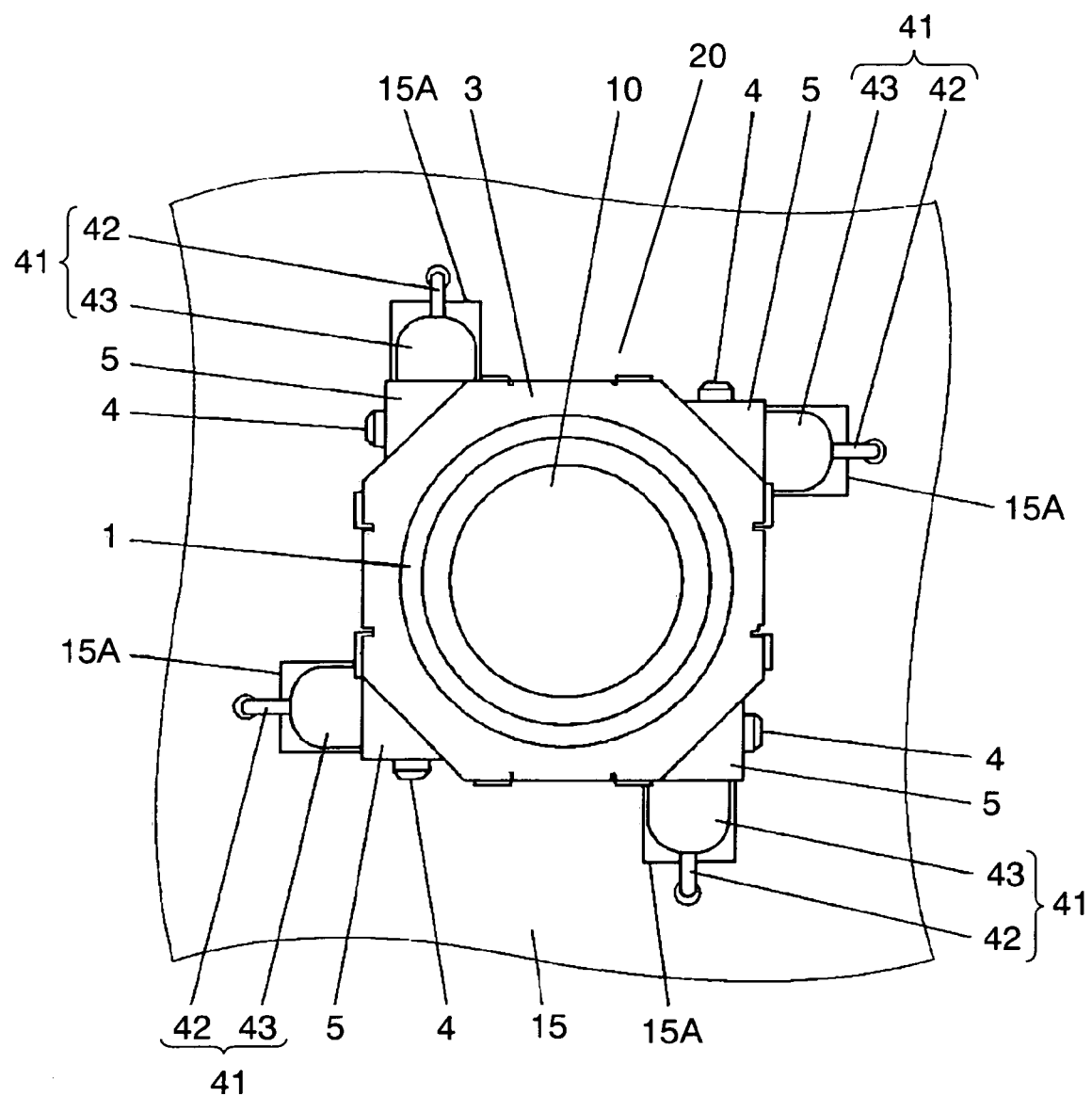
FIG. 2 is a top view of the trackball device.
Figure 3:
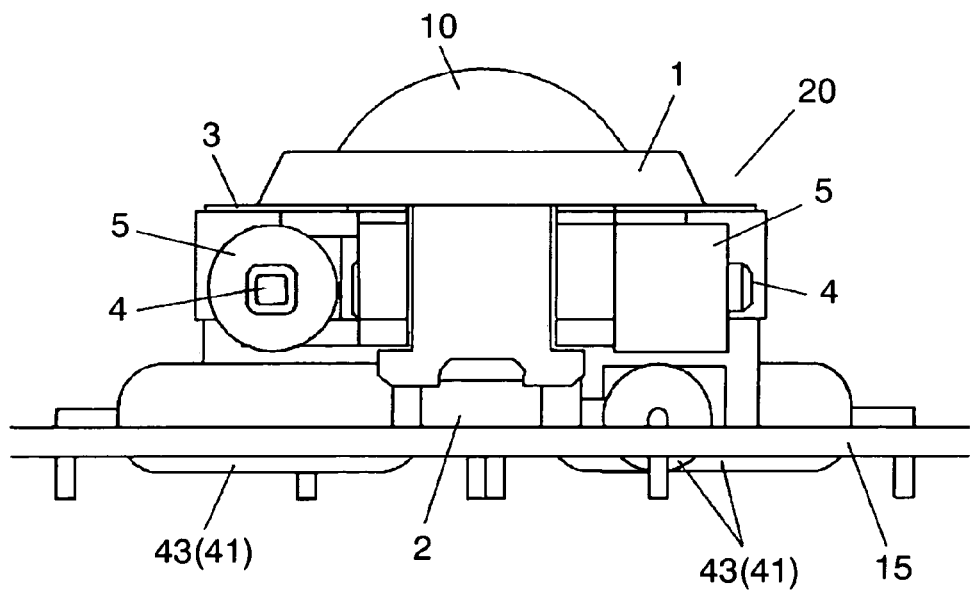
FIG. 3 is a side view of the trackball device.
Figure 4:
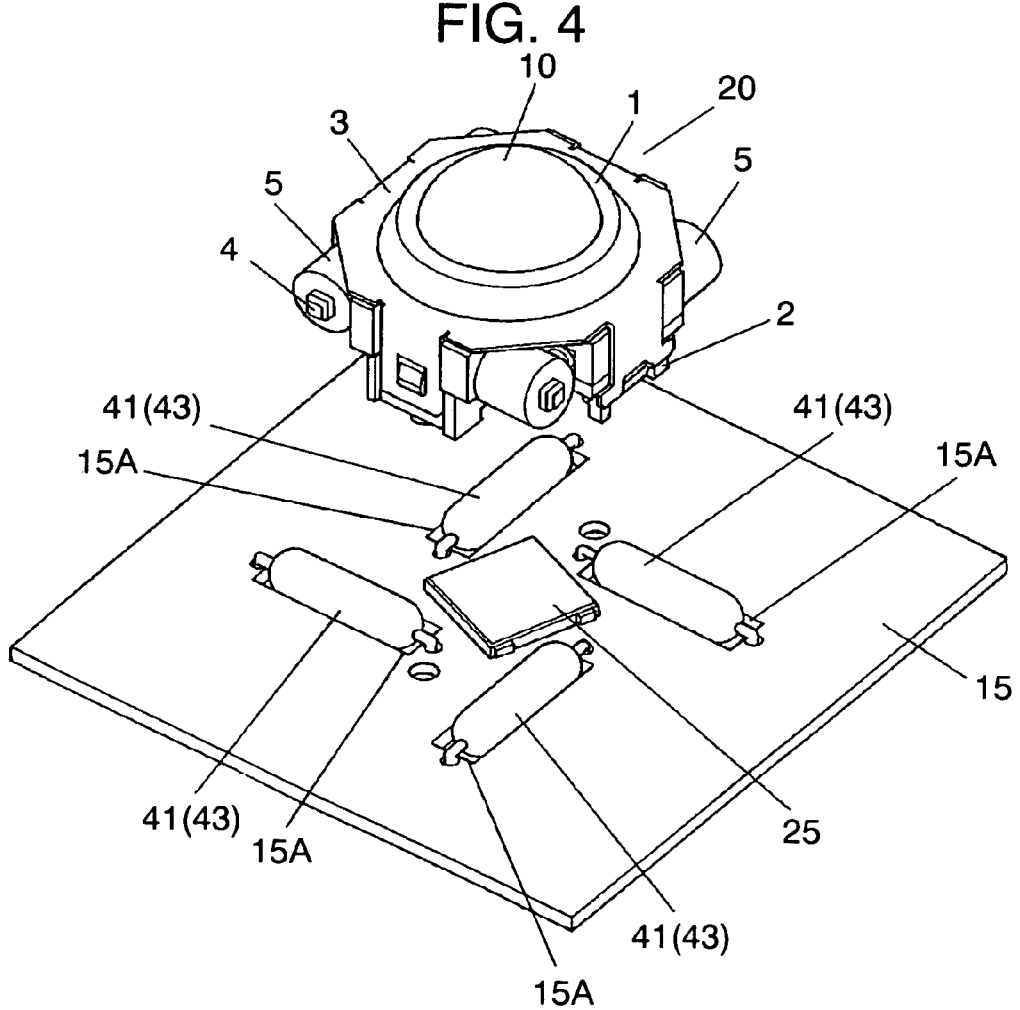
FIG. 4 is a perspective view of the trackball device before assembling a mechanical structure and wiring board.
Figure 5:
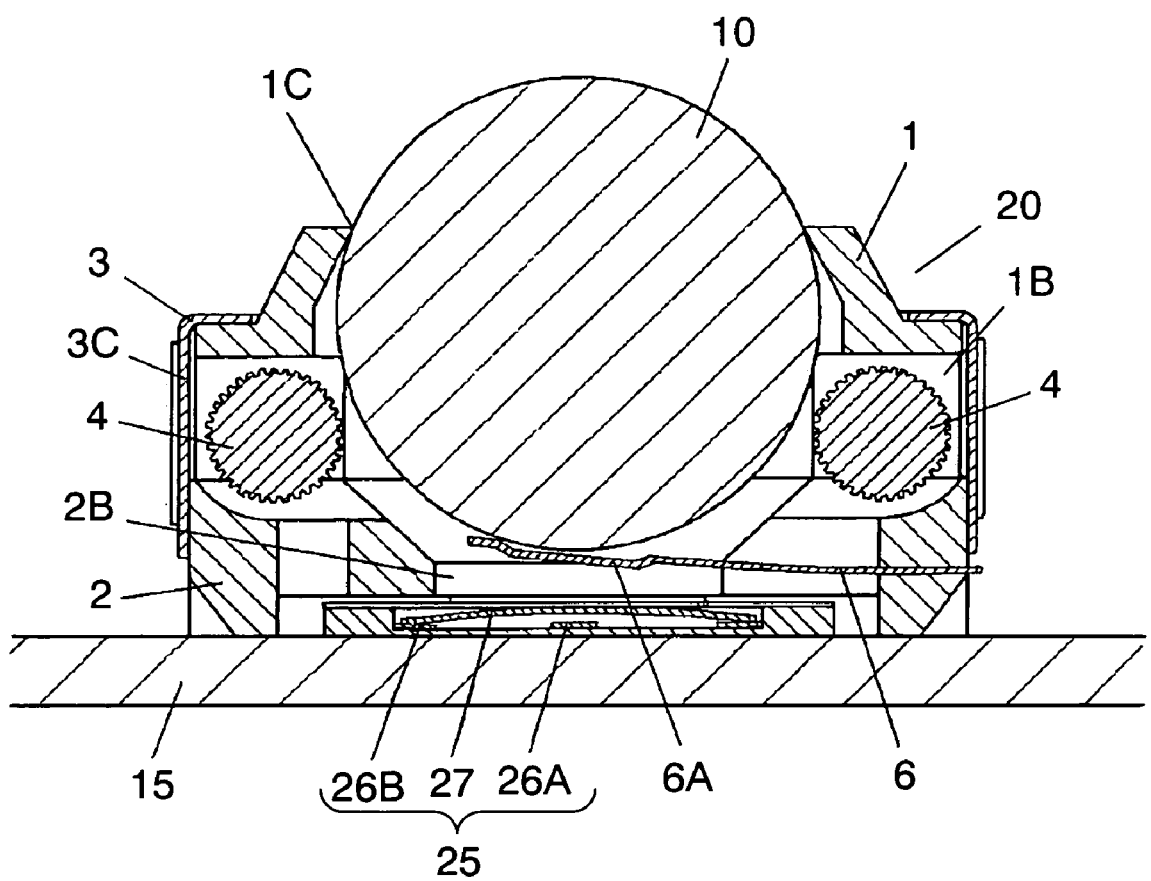
FIG. 5 is a sectional view of the mechanical structure of the trackball device.
Figure 6:
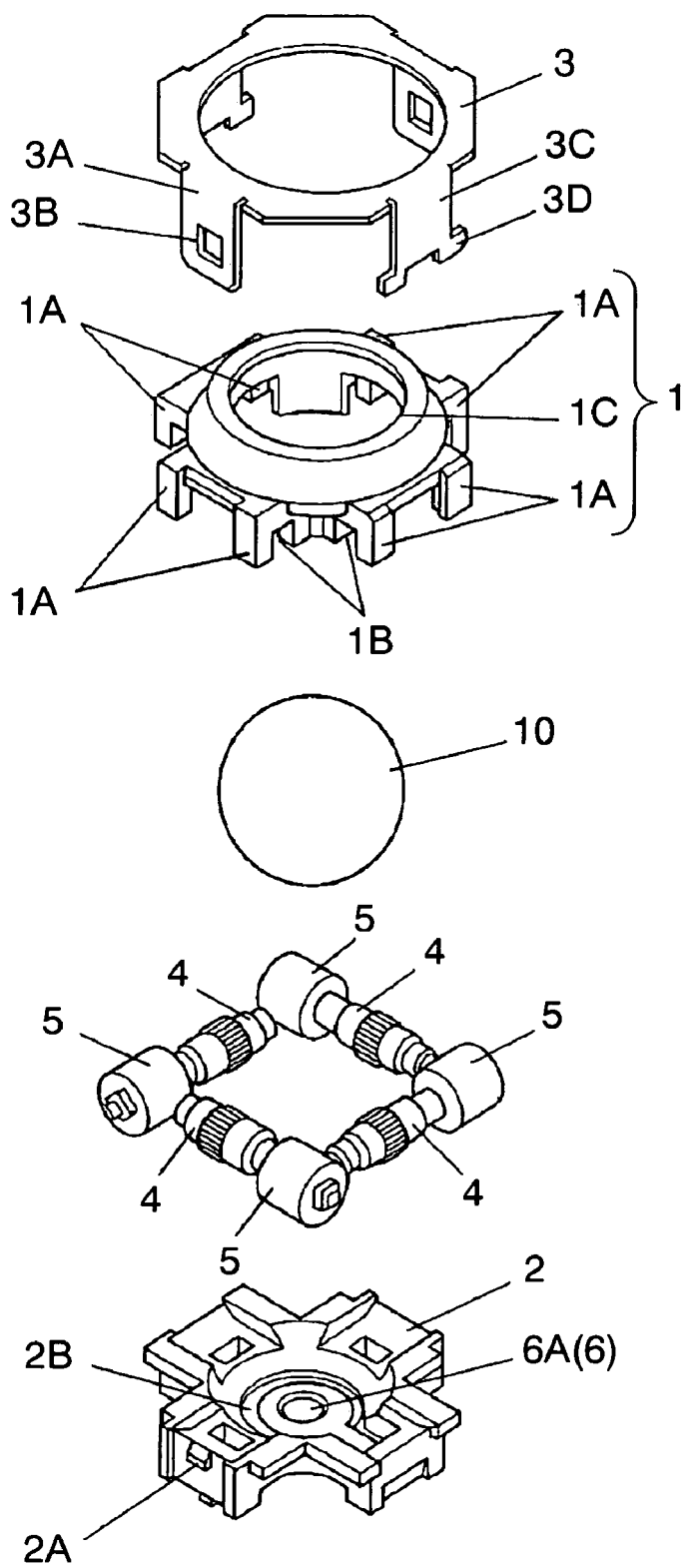
FIG. 6 is an exploded perspective view of the mechanical structure of the trackball device.

FIG. 1 is a perspective view of an appearance of a trackball device in the first exemplary embodiment of the present invention. FIG. 2 is a top view and FIG. 3 is a side view of the trackball device. FIG. 4 is a perspective view of the track ball device before assembling a mechanical structure and wiring board. FIG. 5 is a sectional view and FIG. 6 is an exploded perspective view of the mechanical structure.

As shown in FIGS. 1, 2, 3, and 4, the trackball device in the first exemplary embodiment includes operating ball 10, mechanical structure 20 (including upper case 1, base 2, cover 3, roller 4, and permanent magnet 5), and wiring board 15 (on which push switch 25 and reed switch 41 are mounted).

First, mechanical structure 20 of the present invention is described in detail with reference to FIGS. 5 and 6. Operating ball (hereafter "ball") 10 is housed in an inner space formed by a roughly cross-shaped resin upper case 1 and also roughly cross-shaped resin base 2 laid beneath this upper case 1.

A flat part of metal cover 3 with a hole at its center is disposed on upper case 1. This cover 3 has first legs 3A respectively hanging down from the first opposing sides of the flat part, and second legs 3C respectively hanging down from the second opposing sides perpendicular to the first opposing sides. Through-hole 3B is provided at the tip of each of first legs 3A. A lower end of each of second legs 3C is extended into caulking lug 3D which extends sideways.

Projection 2A which is provided on a side face of base 2 is fitted into through-hole 3B of cover 3, and caulking lug 3D of second leg 3C catches against and is caulked to a side step on base 2 so as to attach upper case 1 and base 2.

A pair of hooks 1A formed into a hook with a downward opening are provided respectively at parts extending sideways to form the rough cross shape of upper case 1. Openings under these hooks 1A configure roller holders 1B. Roughly cylindrical roller 4 is rotatably housed and held in each of roller holders 1B. In total, there are four rollers 4; and two pairs of two rollers 4 opposing each other, when seen from the top, are disposed at right angles to form a square. The lower part of each roller 4 is rotatably held by the top face of base 2. The center part of each roller 4 is roughened and act as a contact area.

Ring-shaped permanent magnet (hereafter "magnet") 5 is coaxially fixed to one end of each roller 4 such that magnet 5 co-rotates with each roller 4. Rollers 4 are disposed such that these magnets 5 are positioned in dents in a cross of upper case 1 and base 2. In other words, each magnet 5 is disposed at a corner of a square formed by rollers 4.

Ball 10, typically made of fluorine-containing rubber, is housed inside the inner space formed by upper case 1 and base 2.

Next, the inner space formed by upper case 1 and base 2 is described.

Round hole 2B is provided at the center of cross of base 2 configuring the bottom of this inner space. The first end of cantilevered flat spring 6 is embedded and fixed to a sidewall around round hole 2B, and the second end of this flat spring 6 is disposed inside this round hole 2B. This second end of flat spring 6 is formed into round protrusion 6A that pushes ball 10 upward from beneath.

Upper case 1 forming this inner space has a cylindrical part protruding upward. Upper round hole 1C at an upper end of this cylinder has a slightly smaller diameter than the outer diameter of ball 10 at the top center of upper case 1. Ball 10, given an upward force by flat spring 6, is positioned upward by the rim of this upper hole 1C, and the top part of ball 10 protrudes outward from this upper hole 1C. A predetermined space is secured between ball 10 in this position and the contact area of each roller 4.

When a downward force is applied to this ball 10, the bottom part of ball 10 presses flat spring 6 down such that ball 10 is vertically movable inside the inner space formed by upper case 1 and base 2.

Mechanical structure 20 in this trackball device is configured as above, and wiring board 15 is disposed under this mechanical structure 20. Reed switch 41, which is a magnetic sensor, and self-resilient push switch 25 with tactile feedback are mounted on the top face of wiring board 15.

As shown in FIGS. 3 and 4, this reed switch 41 is provided respectively at a position vertically opposing to each of magnets 5. Each reed switch 41 outputs on and off signals in response to changes in the magnetic flux of each magnet 5 which co-rotates with corresponding roller 4 when roller 4 is rotated.

Push switch 25 is disposed on wiring board 15 at a position corresponding to the bottom part of ball 10, i.e., the center surrounded by reed switches 41.

Next, the operation of the trackball device in this exemplary embodiment is described. FIG. 5 illustrates the state when the trackball is not operated, FIG. 7 illustrates the state when the user touches the top part of ball 10, typically with a finger, and rotates ball 10 counterclockwise, and FIG. 8 illustrates the state when the top part of ball 10 is pressed down, typically with a finger.

Figure 7:
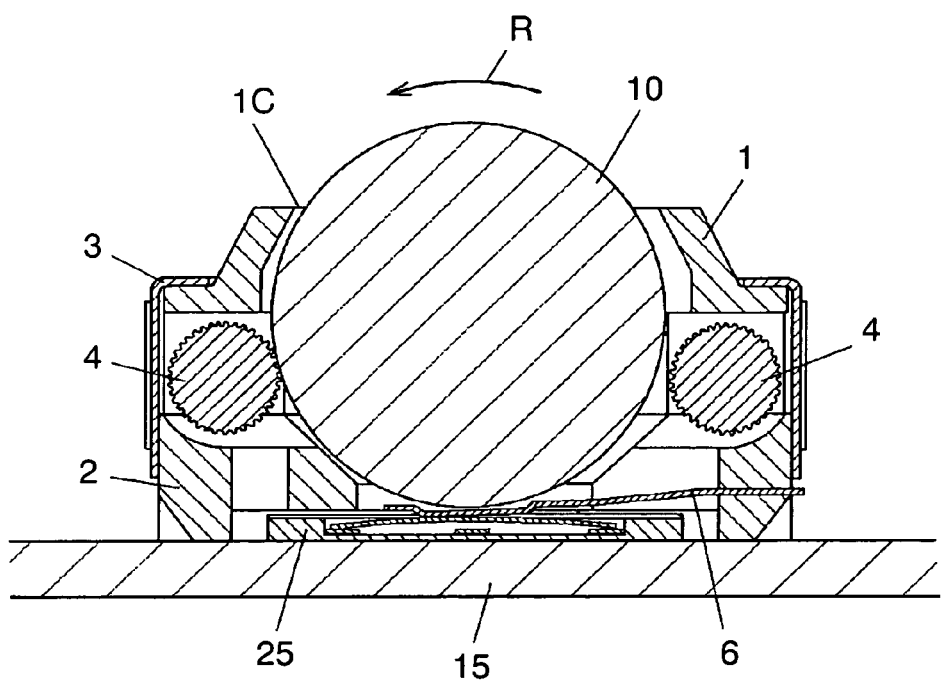
FIG. 7 is a sectional view when the trackball device is rotated.
Figure 8:
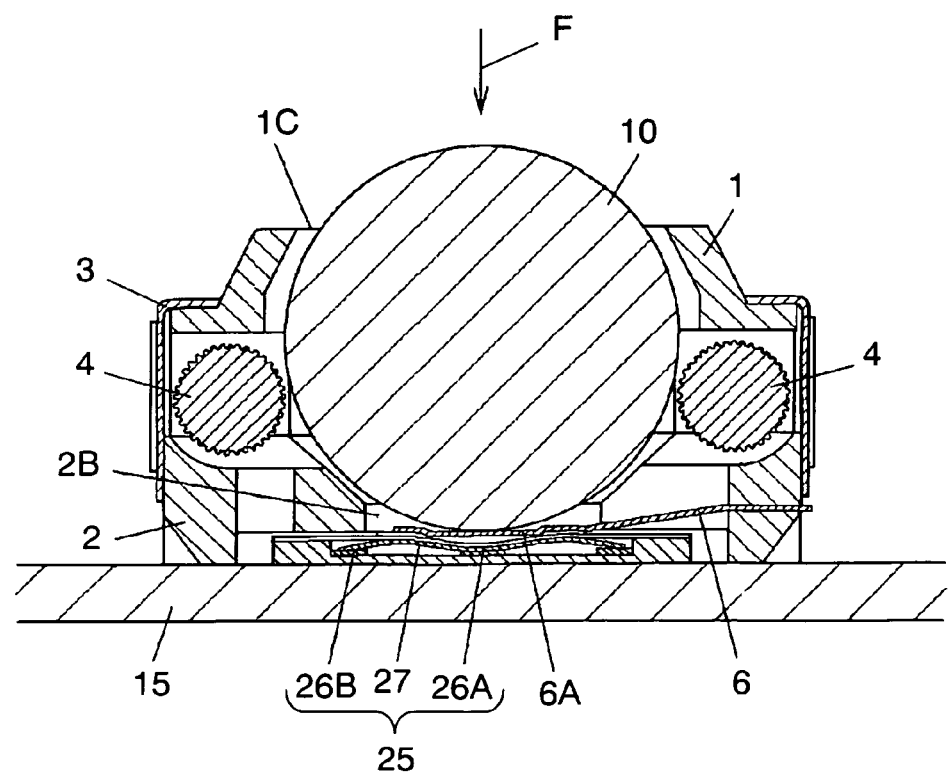
FIG. 8 is a sectional view when the trackball device is pressed.

Next the case is described in which the top part of ball 10 which protrudes from upper hole 1C of upper case 1 is touched, typically with a finger, and rotated counterclockwise as shown by arrow R in FIG. 7 in the normal state in which the trackball device is not operated. Ball 10 presses down the second end of flat spring 6 and moves leftward while being slightly lowered, contacting only roller 4 at the left in FIG. 7 which corresponds to the rotating direction, and rotates this left roller 4. At this point, other rollers 4 do not rotate, and push switch 25 is also not activated.

In line with the rotation of this left roller 4, magnet 5 fixed to left roller 4 co-rotates. This repeatedly makes the north pole and south pole of magnet 5 alternately approach reed switch 41 opposing to this magnet 5. In response, reed switch 41 generates a predetermined output.

In the same way, when ball 10 is rotated clockwise, backward, or forward, similar movement takes place, and a predetermined output is generated from predetermined reed switch 41.

When ball 10 is rotated in an oblique direction, ball 10 contacts two perpendicularly positioned rollers 4, and rotates both rollers 4. Accordingly, a predetermined output is generated from two reed switches 41.

Next, when the top part of ball 10 is pressed typically with a finger, as shown by arrow F in FIG. 8, in the normal state, ball 10 presses down the second end of flat spring 6 and sinks in the direction of round hole 2B of base 2. In response to this movement, the bottom face of protruding part 6A provided on the second end of flat spring 6 pushes down the center of push switch 25.

When the pressing force exceeds a predetermined value, movable contact 27 of push switch 25 inverts, giving tactile feedback, and central fixed contact 26A and outer fixed contact 26B electrically couple via movable contact 27, establishing a switched-on state.

If the force applied to ball 10 is then gradually released, the elastic restoring force of movable contact 27 of push switch 25 regains its original dome shape, and the electrical contact is broken between central fixed contact 26A and outer fixed contact 26B of push switch 25. The second end of flat spring 6 also returns to its original position, and ball 10 is moved back upwards, propelled by the return of flat spring 6. Ball 10 stops when it contacts the rim of upper hole 1C of upper case 1, and thus returns to the normal state shown in FIG. 5.

Next, the relation between permanent magnet 5 and reed switch 41 is described.

Reed switch 41 is made by providing two narrow linear reeds 42, made of a thin magnetic sheet such as Permalloy, in a tube-like outer package 43 made such as of glass filled with inert gas. In outer package 43, the first ends of reeds 42 overlap at the center in the longer direction and are separated by a predetermined gap, and the second ends of reeds 42 are respectively led out linearly from the sides in the longer direction. Portions led out are bent downward at predetermined positions to form terminals.

Each reed switch 41 is disposed on wiring board 15 such that its center in the longer direction of outer package 43 is positioned right under each magnet 5 fixed to roller 4, and also the longer direction of outer package 43 is perpendicular to the rotation shaft centerline of corresponding roller 4. This alignment achieves a proximity layout for magnetic poles alternately provided at a predetermined angle pitch in corresponding ring magnet 5 and two reeds 42 of each reed switch 41. In addition, the longer direction (reed direction) of reeds 42 and the rotation shaft centerline of magnet 5 are perpendicular, making the width direction of magnetic pole match the longer direction of reed 42. This induces more magnetic flux of magnet 5 to act on reed 42. If a lower part of outer package 43 is housed in hole 15A on wiring board 15, the height from the level of wiring board 15 can be easily reduced. Push switch 25 in the above description is mounted and soldered at the center of the rectangle formed by reed switches 41, and the terminals of reed switches 41 are also soldered and fixed.

When ball 10 is rotated, the corresponding roller 4 which contacts the ball 10 in the operating direction and the magnet 5 that is fixed to roller 4 are both rotated. This repeatedly makes the north pole and south pole of magnet 5 alternately approach reed switch 41 disposed underneath this magnet 5. As a result of the change in magnetic flux of magnet 5, first ends of reeds 42 of reed switch 41 repeatedly contact and separate, and thus the rotation of roller 4, i.e., ball 10, is detectable in noncontact fashion. A reed switch is a relatively inexpensive magnetic sensor. Accordingly, the use of a reed switch cuts the cost of the trackball device.

Next, changes in the state of reed switch 41 when magnet 5 is rotated is described with reference to FIGS. 9, 10, and 11. In the following description, left reed 42A is indicated to the left, and right reed 42B is indicated to the right in the drawings.

Figure 9:
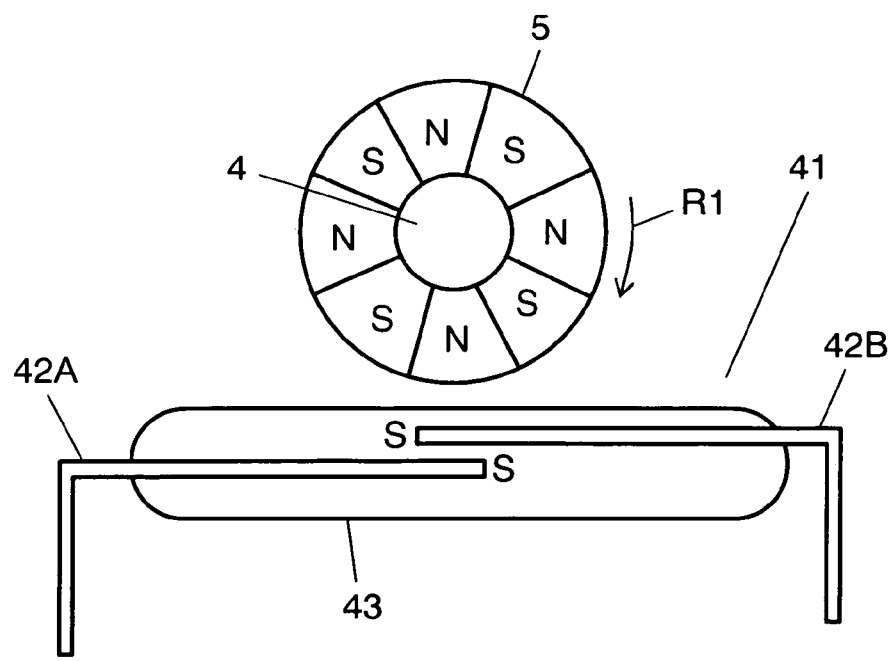
FIGS. 9 and 10 illustrate changes in the state of a reed switch in the trackball device.

First, as shown in FIG. 9, for example, when the center angular position of the north pole of magnet 5 faces reed switch 41, the first end of left reed 42A at the center of outer package 43 is magnetized to the south pole by the magnetic flux of magnet 5; and the lead-out portion from outer package 43 is magnetized to the north pole. The first end of right reed 42B at the center of outer package 43 also is magnetized to the south pole, and the lead-out portion from outer package 43 is magnetized to the north pole. Since the first ends of left reed 42A and right reed 42B opposing each other are both south poles, they repel each other and the reed switch 41 is maintained in the off state.

In this state, magnet 5 strongly attracts reeds 42A and 42B, and this force holds back the rotation of roller 4. This is transmitted to the user as tactile feedback via ball 10. To make this attractive force stronger, reed switch 41 is disposed such that each magnetic pole of magnet 5 is set in the same direction as the longer side of reeds 42A and 42B so that more magnetic flux of magnet 5 can act on reeds 42A and 42B. In general, reeds 42A and 42B are straight inside outer package 43 and at the lead-out portion. Accordingly, to achieve the above condition, the rotation shaft centerline of roller 4 and the centerline in a longer direction of outer package 43 of reed switch 41 are disposed perpendicularly.

Figure 10:
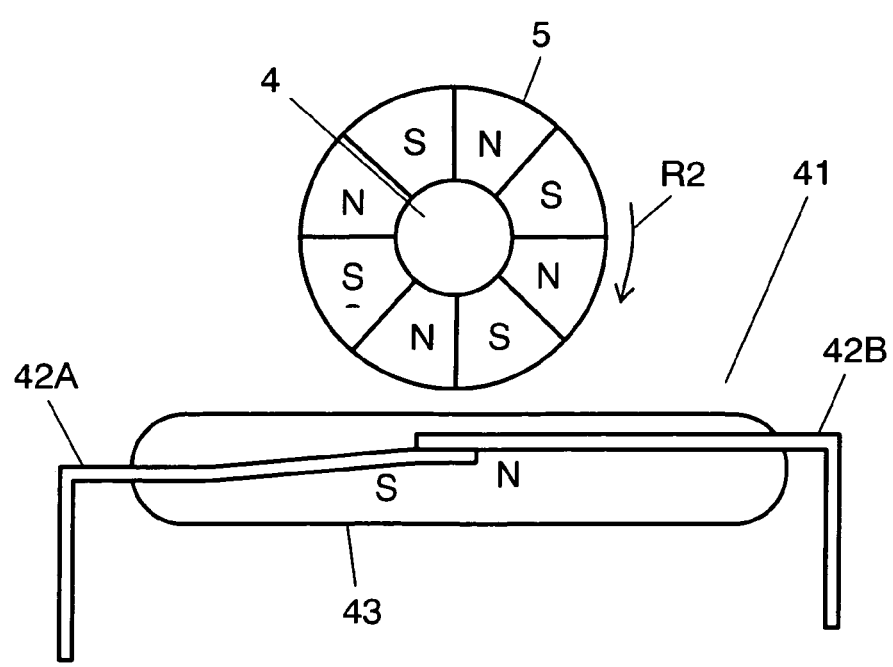

From the above state, when ball 10 is rotated to rotate roller 4, i.e., magnet 5, clockwise (arrow R1), the state shown in FIG. 10 is achieved. More specifically, both the north pole in the above description and the south pole adjacent to it approach the center of outer package 43. In this state, the direction of magnetic flux changes so as to act roughly parallel to the longer direction of the reeds 42A and 42B in outer package 43. This brings left reed 42A from around the center to the first end to the south pole, and brings right reed 42B from the first end to around the center to the north pole. At this point, as shown in FIG. 10, the first ends of opposing reeds 42A and 42B attract each other and come into contact, turning on reed switch 41.

Also in this state, magnet 5 attracts reeds 42A and 42B, but this attractive force becomes weaker in proportion to the direction of the magnetic flux acting on reeds 42A and 42B. Accordingly, the force is not strong enough to give the user any tactile feedback by holding back the rotation of roller 4.

When magnet 5 is further rotated clockwise (arrow R2), the center angular position of the south pole of magnet 5 as described above arrives at around the center of outer package 43 (not illustrated). In this state, the first ends of reeds 42A and 42B both become the north pole, thus repelling each other again. Accordingly, the first ends separate again, and reed switch 41 is turned off. At this point, magnet 5 strongly attracts reeds 42A and 42B, holding back the rotation of roller 4. This is transmitted as tactile feedback to the finger via ball 10.

Then, when roller 4 is further rotated in the same direction and the next north pole approaches, the direction of magnetic flux acting on reeds 42A and 42B changes roughly parallel to the longer direction of reeds 42A and 42B again. The first ends of reeds 42A and 42B become different poles, and reed switch 41 turns on. At this point, the attractive force generated between magnet 5 and reeds 42A and 42B is weak due to the direction of magnetic flux, as described above, and thus no tactile feedback can be detected.

The above operations are repeated as roller 4 is rotated. FIG. 11 shows the output signals and the variation in the force holding back the rotation of roller 4.

Figure 11:
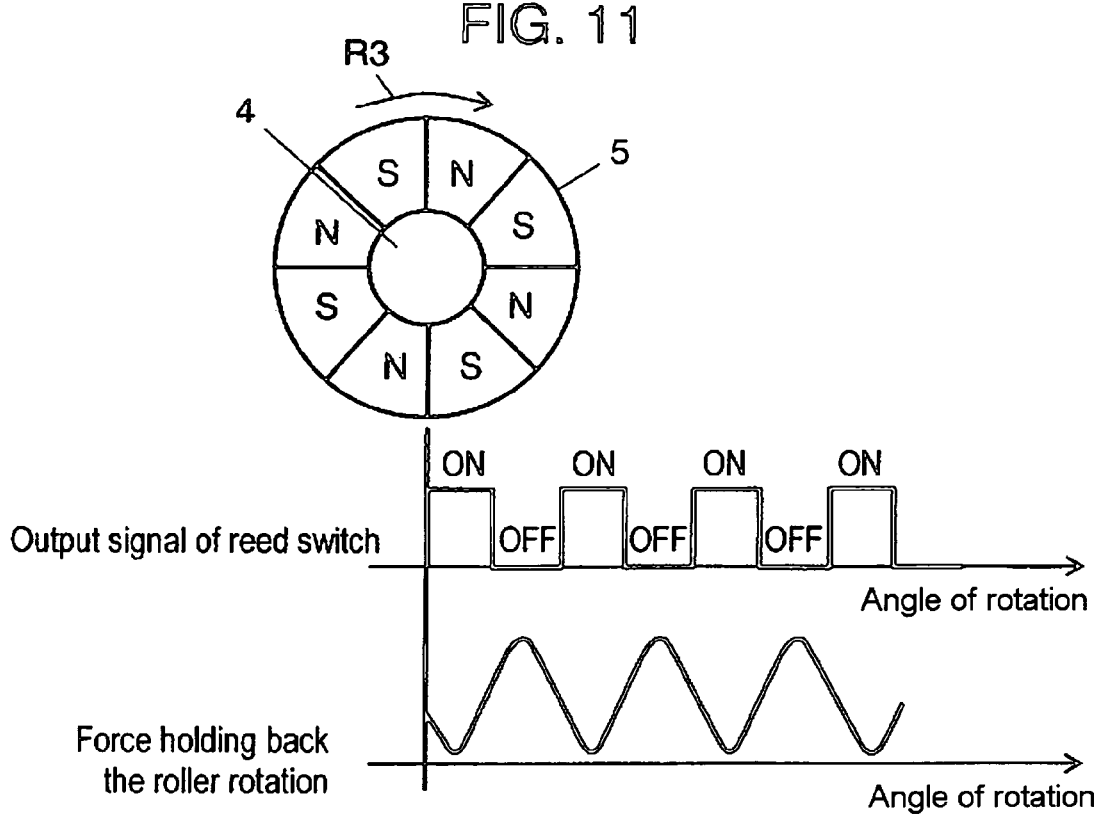
FIG. 11 illustrates output signals from the reed switch of the trackball device and the variation in a force holding back the rotation of a roller.

As shown in FIG. 11, the output signals generated from reed switch 41 are repetition of on and off. The degree of rotation of roller 4, i.e., the rotation amount of ball 10, is detectable by processing these output signals using, typically, a microcomputer (not illustrated).

The force that holds back the rotation of the roller 4, generated by the attractive force between magnet 5 and reeds 42A and 42B, i.e., a rotation-restricting force applied to roller 4, changes in a curve like a sine wave, as shown in FIG. 11. Since reed switch 41 is disposed with respect to magnet 5 in such a way that its rotation-restricting force intensifies when the switch is turned off, this rotation-restricting force when the switch is turned off is transmitted as detectable tactile feedback via ball 10.

As described above, the trackball device of the present invention allows detection of the rotation of roller 4 in noncontact fashion using magnet 5 fixed to roller 4 and reed switch 41. In addition, tactile feedback is provided without the need for additional components. The rotation of roller 4 is held back simply by magnet 5 and reed switch 41, and this holding-back effect is transmitted as distinct tactile feedback via ball 10. Accordingly, the present invention offers an inexpensive structure. Since the trackball device of the present invention is configured without using other components for generating tactile feedback, the present invention also contributes to the design of increasingly necessary smaller and lighter equipment.

Second Exemplary Embodiment

The second exemplary embodiment describes an example of another alignment of magnets and reed switches for applying a rotation-restricting force to the rollers described in the first exemplary embodiment. The same reed switches are used, but different reference marks are given for easier understanding. Other components same as those already described are given the same reference marks to omit duplicate description.

Figure 12:
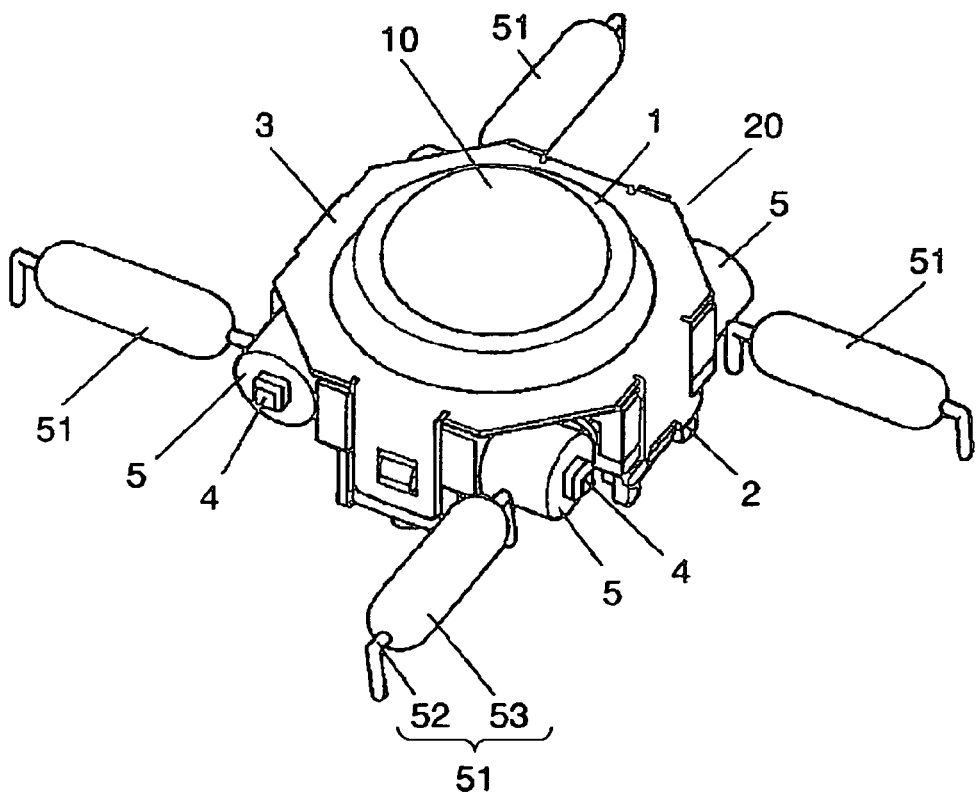
FIG. 12 is a perspective view of an appearance of a trackball device in accordance with the second exemplary embodiment of the present invention.
Figure 13:
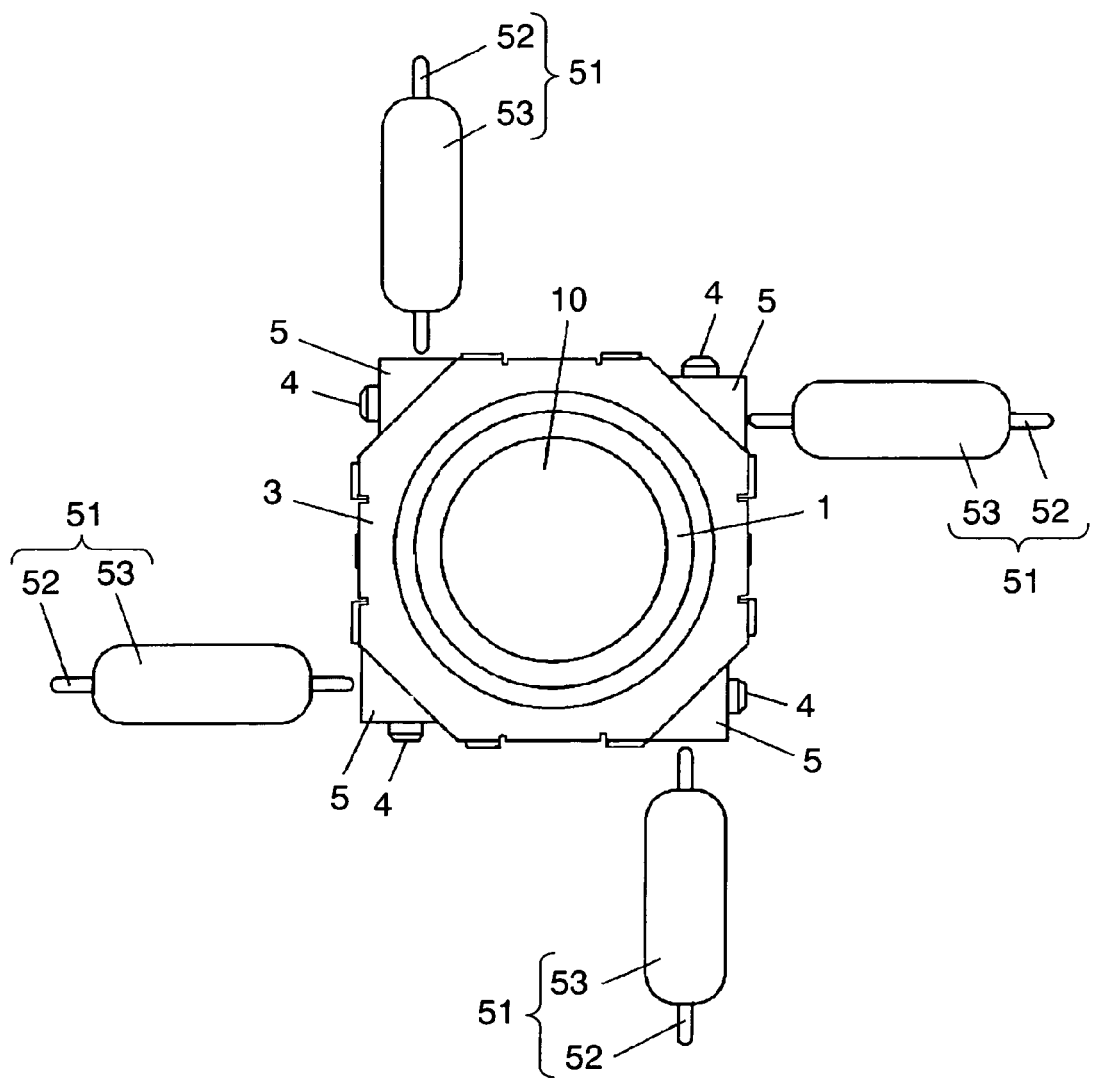
FIG. 13 is a top view of the trackball device.
Figure 14:
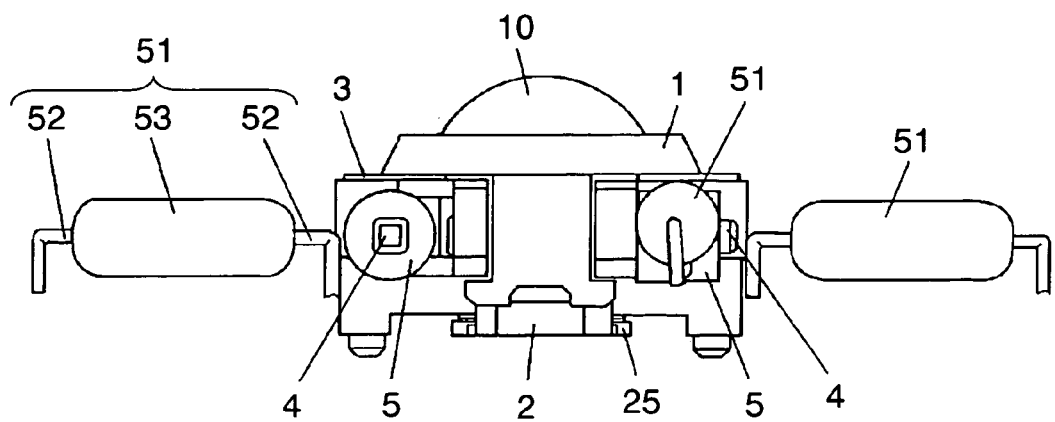
FIG. 14 is a side view of the trackball device.

FIG. 12 is a perspective view of an appearance of a trackball device in the second exemplary embodiment of the present invention. FIG. 13 is a top view and FIG. 14 is a side view of the trackball device. As shown in the drawings, the trackball device in this exemplary embodiment has the same mechanical structure 20 as the first exemplary embodiment, and reed switches 51 are respectively disposed on a periphery of corresponding four rollers 4 with magnets 5 forming a rectangle.

In each reed switch 51, one lead-out portion of reed 52 led out linearly from the side of tube-like outer package 53 is positioned at the same height as the rotation shaft centerline of corresponding roller 4, i.e., magnet 5. In addition, the longer direction (reed direction) of this reed 52 and the rotation shaft centerline of roller 4 mentioned above are perpendicular. Accordingly, this reed 52 is disposed in proximity to the side in the circumferential direction of magnet 5 fixed to one end of roller 4. The lead-out portions of two reeds 52 are bent downward at predetermined positions to form terminals.

Next the operation of the trackball device in the above alignment is described. The operation that push switch 25 disposed underneath ball 10 activates by pressing down ball 10 in this alignment is the same as that in the first exemplary embodiment, and thus its description is omitted. Still more, when ball 10 is rotated by touching the top part of ball 10 typically with a finger and corresponding roller 4 with magnet 5 in the rotating direction rotates, reed switch 51 provided corresponding to this roller 4 operates in the same way as in the first exemplary embodiment: The overlapping first ends of two reeds 52 at the center inside outer package 53 repeatedly contact and separate, and the degree of rotation of roller 4, i.e., ball 10 is detectable by processing output signals using, typically, a microcomputer (not illustrated).

Figure 15:
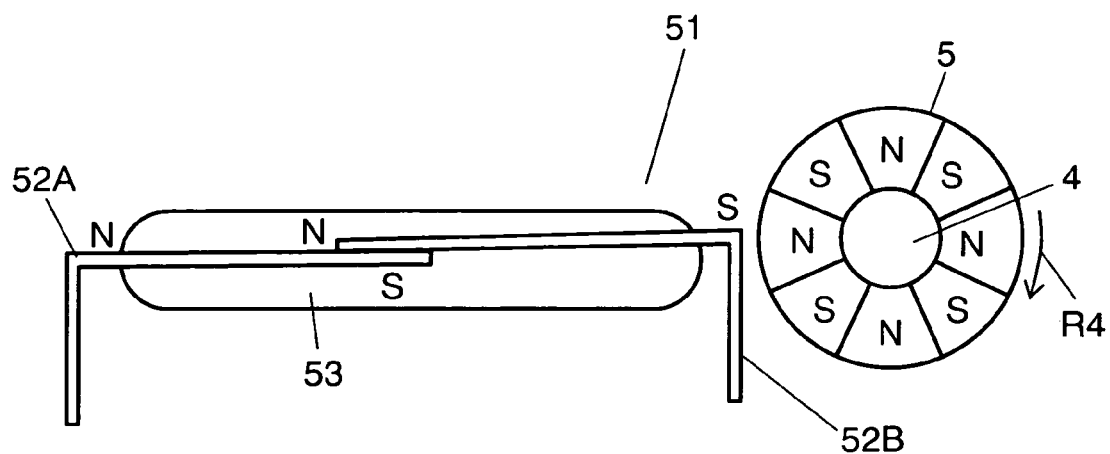
FIGS. 15 and 16 illustrate changes in the state of a reed switch of the trackball device.

Now, as in the first exemplary embodiment, changes in the state of reed switch 51 is described with reference to FIGS. 15, 16, and 17. Same as in the first exemplary embodiment, two reeds 52 of reed switch 51 are defined as left reed 52A which is to the left, and right reed 52B which is to the right in the drawings.

First, for example, when the center angular position of the north pole of magnet 5 faces the lead-out portion of right reed 52B coming out from outer package 53 of reed switch 51, this lead-out portion is magnetized to the south pole by the magnetic flux of magnet 5; and the first end in outer package 53 is magnetized to north pole. This brings the first end of left reed 52A in outer package 53 to south pole. Accordingly, the first ends attract each other and come into contact, turning on reed switch 51.

In the above state, magnet 5 strongly attracts reeds 52B and 52A whose first ends are in contact, and this force holds back the rotation of roller 4. This is transmitted to the user as tactile feedback via ball 10. To make this attractive force stronger, reed switch 51 is disposed such that the lead-out portion of right reed 52B of reed switch 51 matches the direction of magnetic flux of magnet 5 and is also disposed in proximity to magnet 5 so that more magnetic flux of magnet 5 can act on reeds 52A and 52B.

Figure 16:
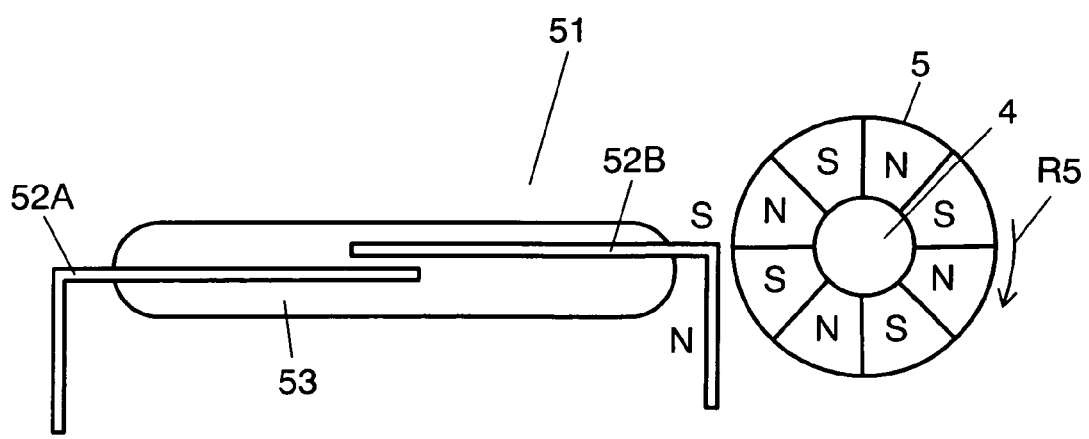

From the above state, when ball 10 is rotated to rotate roller 4, i.e., magnet 5, clockwise (arrow R4), the state shown in FIG. 16 is achieved. More specifically, both the north pole in the above description and the south pole adjacent to it approach the terminal of right reed 52B. In this state, the direction of magnetic flux changes to toward the terminal. This brings an area around the lead-out portion of right reed 52B coming out from outer package 53 to south pole, and brings the terminal to north pole. In this state, right reed 52B is magnetized in proportion to the above direction of magnetic flux, and thus the first end in outer package 53 is not fully magnetized. Accordingly, the first end of left reed 52A in outer package 53 also becomes not fully magnetized. As a result, the first ends do not attract each other and separate, changing to a switched-off state.

At this point, the attractive force generated between magnet 5 and reeds 52A and 52B is weak, and thus this attractive force is not strong enough to be transmitted as a rotation-restricting force applied to roller 4.

Then, when roller 4 is further rotated in the same direction (Arrow R5) and the center angular position of the south pole in the above description faces the lead-out portion of right reed 52B coming out from outer package 53 (this state is not illustrated), the direction of magnetic flux of magnet 5 matches the direction of the longer direction of right reed 52B again. This brings lead-out portion to north pole, and brings the first end in outer package 53 to south pole. In response, the first end of left reed 52A becomes the north pole. Accordingly, the first ends attract each other and come into contact, turning on reed switch 51. Also in this state, magnet 5 strongly attracts reeds 52B and 52A whose first ends are in contact. This acts to hold back the rotation of roller 4, and is transmitted as tactile feedback to a finger operating ball 10.

Then, when roller 4 is further rotated in the same direction and next north pole approaches the terminal of right reed 52B, the lead-out portion of right reed 52B becomes the north pole and the terminal becomes the south pole. At the same time, the first end of right reed 52B becomes not fully magnetized. In response, the first end of left reed 52A also becomes not fully magnetized, resulting in a switched off state because the first ends do not attract each other and separate. In this state, an attractive force between magnet 5 and each of reeds 52B and 52A is not strong enough to apply a rotation-restricting force to roller 4.

The above operations are repeated as roller 4 is rotated. FIG. 17 shows the output signals and the variation in the force holding back the rotation of roller 4.

Figure 17:
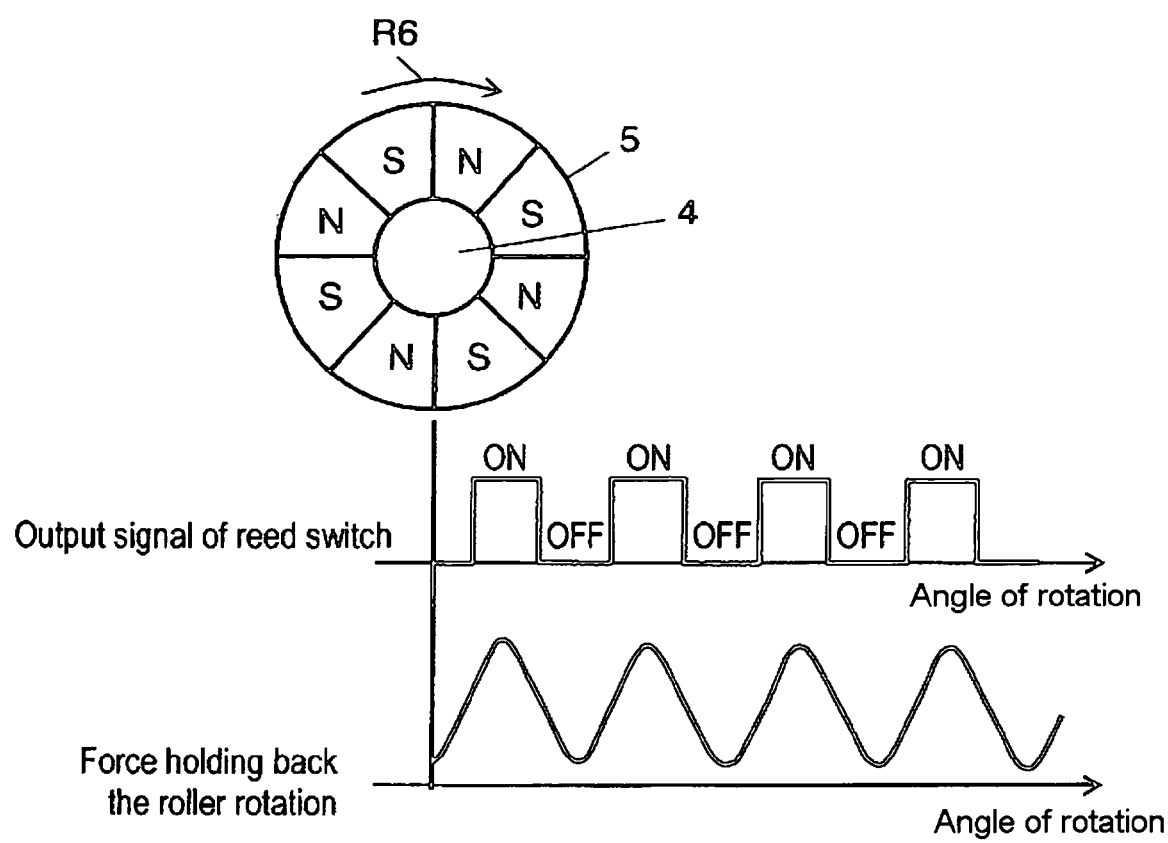
FIG. 17 illustrates output signals from the reed switch of the trackball device and variation in a force holding back the rotation of a roller.
Figure 19:
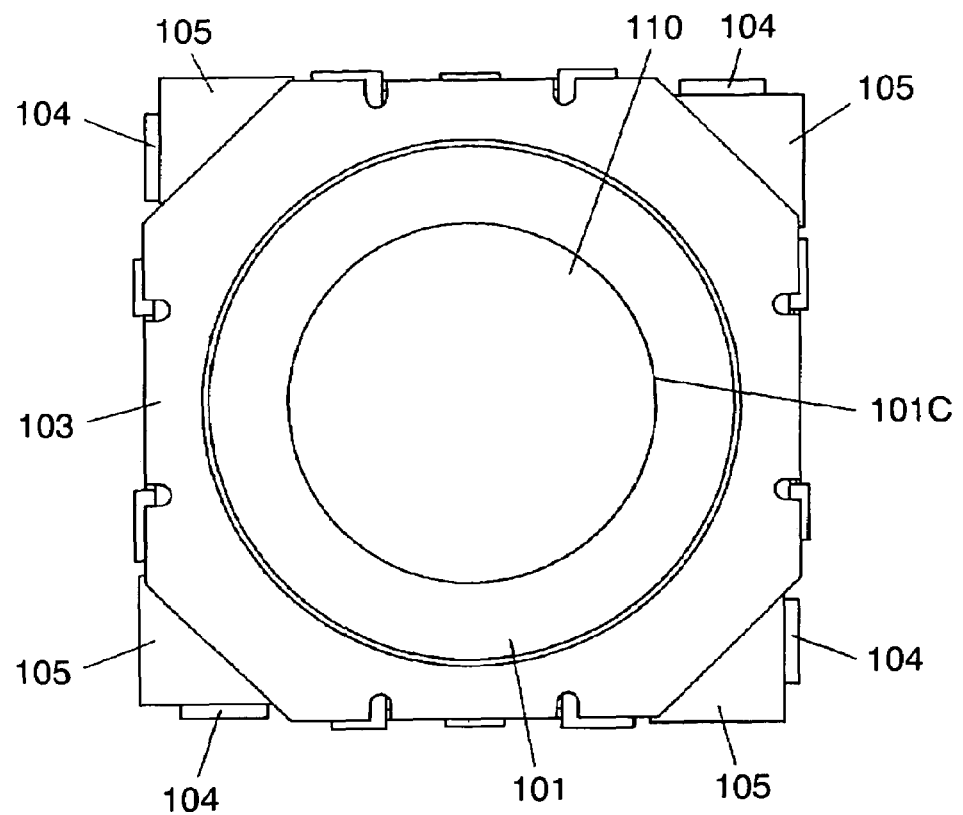
FIG. 19 is a top view of the conventional trackball device.
Figure 20:
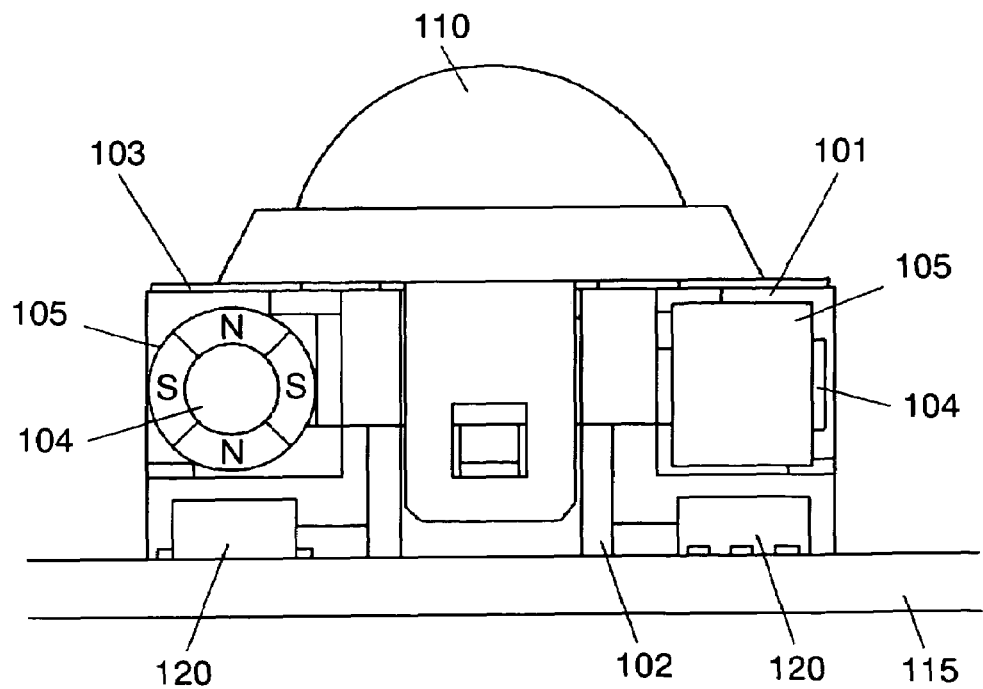
FIG. 20 is a side view of the conventional trackball device.

As shown in FIG. 17, the output signals generated from reed switch 51 are repetition of on and off also in this exemplary embodiment. The force that holds back rotation of the roller 4, i.e., a rotation-restricting force applied to roller 4, changes in a curve like a sine wave. Since reed switch 51 is disposed with respect to magnet 5 in such a way that its rotation-restricting force intensifies when the switch is turned on, this rotation-restricting force when the switch is turned on is transmitted as detectable tactile feedback via ball 10. As already described, the degree of rotation of roller 4, i.e., the rotation amount of ball 10, is detectable by processing these output signals generated from reed switch 51 using, typically, a microcomputer (not illustrated).

The trackball device in the second exemplary embodiment also allows detection of the rotation of roller 4 in noncontact fashion using magnet 5 fixed to roller 4 and reed switch 51. In addition, tactile feedback is provided without the need for additional components. The rotation of roller 4 is held back simply by magnet 5 and reed switch 41, and this holding-back effect is transmitted as distinct tactile feedback via ball 10 when rotating ball 10. Accordingly, the present invention offers an inexpensive structure.

In the exemplary embodiments, better tactile feedback can be provided when the reed switch is disposed in proximity to the magnet, and the magnet and the reed are positioned as close as possible so that more magnetic flux of the magnet can act on the reed.

It is apparent that tactile feedback when rotating the ball can be provided using other alignments of the magnets and reed switches than those described in the exemplary embodiments.

In the exemplary embodiments, the rotation shaft centerline of the magnet and the centerline linking the left and right terminals of the reed switch are set perpendicular to each other so as to provide tactile feedback when rotating the ball. However, an alignment that the rotation shaft centerline of the magnet and the centerline linking the left and right terminals of the reed switch are parallel, or a combination of both perpendicular and parallel alignments are also applicable.

The invention claimed is:

1. A trackball device comprising:
an operating ball;
a plurality of rollers configured to rotate by contacting the ball while the ball is rotated;
a plurality of multipole permanent magnets configured to co-rotate with each of the rollers, respectively, each of the permanent magnets having a ring shape; and
a plurality of reed switches arranged in positions such that each of the reed switches turns on and off as a result of changes in magnetic flux caused by rotation of a respective one of the permanent magnets,
wherein the reed switches are configured and arranged with respect to the permanent magnets such that an attractive force generated between one of the reed switches and a respective one of the permanent magnets affects a rotation state of a respective one of the rollers and transmits a tactile feedback via the ball while the ball is rotated,
wherein each of the reed switches is disposed at a height equal to a height of a rotation axis of the respective one of the permanent magnets in a circumferential direction of the respective one of the permanent magnets,
and wherein each of the reed switches is further configured and arranged with respect to the respective one of the permanent magnets such that the attractive force intensifies when the switch is turned on.

2. The trackball device as defined in claim 1, wherein a space is secured between the ball and the rollers when the ball is not operated.

3. The trackball device as defined in claim 1, wherein the ball contacts one or two of the rollers when the ball is rotated.

4. The trackball device as defined in claim 1, wherein the plurality of reed switches is constituted by four reed switches, the four reed switches being provided such that two pairs of two opposing reed switches are disposed perpendicular to each other.

5. The trackball device as defined in claim 1, wherein a rotation axis of each of the permanent magnets is the same as that of a respective one of the rollers.

6. The trackball device as defined in claim 5, wherein each of the reed switches is disposed in proximity to a respective one of the permanent magnets such that a reed direction of each of the reed switches is perpendicular to the rotation axis of the respective one of the permanent magnets.

7. The trackball device as defined in claim 5, further comprising a wiring board on which the reed switches are mounted, the wiring board having holes for housing a part of the reed switches, respectively.

* * * * *